United States Patent [19]

Gleichert et al.

[11] Patent Number: 5,347,547
[45] Date of Patent: Sep. 13, 1994

[54] METHOD AND APPARATUS FOR SYNCHRONIZING TRANSMITTER AND RECEIVER FOR HIGH SPEED DATA COMMUNICATION

[75] Inventors: Marc C. Gleichert, San Jose; Yun-Che Wang, Los Altos, both of Calif.

[73] Assignee: Advanced Micro Devices, Inc., Sunnyvale, Calif.

[21] Appl. No.: 839,978

[22] Filed: Feb. 21, 1992

[51] Int. Cl.$^5$ ................... H04L 7/00; G06F 11/10
[52] U.S. Cl. ........................ 375/114; 375/106
[58] Field of Search ............. 375/114, 116–117, 375/106; 370/105.1, 105.4, 106

[56] References Cited

U.S. PATENT DOCUMENTS

| | | | |
|---|---|---|---|
| 4,128,809 | 12/1978 | Kage | 375/100 |
| 4,646,328 | 2/1987 | Rion | 375/116 |
| 4,646,329 | 2/1987 | Bojarski | 375/116 |
| 4,763,339 | 8/1988 | Sutphin et al. | 375/114 |
| 4,788,681 | 11/1988 | Thomas et al. | 375/114 |
| 5,052,026 | 9/1991 | Walley | 375/116 |

FOREIGN PATENT DOCUMENTS 0236017  10/1987  European Pat. Off. .

OTHER PUBLICATIONS

A. X. Widmer and P. A. Franaszek, "IBM Journal of Research and Development," Sep. 1, 1983, vol. 27, No. 5, pp. 440–451.

*Primary Examiner*—Stephen Chin
*Assistant Examiner*—Young Tse
*Attorney, Agent, or Firm*—Gerald Fisher

[57] ABSTRACT

A method and apparatus for improving the reliability of resynchronization in a serial frame based protocol communication system which can avoid resynchronization when line loss erroneously causes data to appear as a redundant unique code pattern. The synchronization is only initiated if two such unique code pattern bytes are received within a specified time separation.

11 Claims, 2 Drawing Sheets

METHOD AND APPARATUS FOR SYNCHRONIZING TRANSMITTER AND RECEIVER FOR HIGH SPEED DATA COMMUNICATION

FIELD OR THE INVENTION

This invention relates to methods and apparatus for synchronizing high speed data transmitters and receivers and more particularly to methods and apparatus for controlling receiver byte alignment in conditions of erroneous sync code transmission.

BACKGROUND OF INVENTION

Several high speed data communications systems are known which employ encodement of transmitted data in a unique way so that byte boundaries can be conveniently recovered and so that DC balance of the coded data is maintained. One such system is known as the 8B/10B code which is described in the article by Widmer et al., entitled "A DC Balanced Partitioned Black, 8B/10B Transmitter Code," *"Journal of Research and Development,"* Volume 27, 1983, pp. 440–451.

As described in the above article, special encoded characters are provided for several command purposes which characters are distinguishable from other valid coded characters even when byte boundaries are incorrectly aligned. One major purpose of such special characters is for synchronization between the transmitter and receiver. In the 8B/10B System, the special characters are generated by the same coding rules used for data encodement regarding disparity, maximum run length and maximum digital sum variation. A first group of eight of the special characters are called K28.X. These special characters can be recognized as other than data because $abcdei = 001111$ or $110000$. Valid data code does not have the case $c = d = e = i$.

By virtue of the 8B/10B rules set forth in the above article, the code provides three characters K28.1, K28.5 and K28.7 which are defined as containing a "comma." Comma is defined as a unique digital sequence which will occur with uniform alignment relative to byte boundaries. This means, absent transmission error, that the comma sequence cannot occur by misalignment of any valid data or command code in combination with other valid code. The binary 10 bit 0011111XXX has this characteristic. Several codes are defined which contain the comma sequence. The ANSI X3T9.3 Fibre Channel Standard Working Group has selected one such code, K28.5.5, and has established its use as the first byte of all delimiters and primatives. Each delimeter and primitive is defined as a four byte set. In the Fibre Channel Standard, K28.5 is not permitted to be followed by K28.1 or K28.7 in any of the defined command ordered sets, such as Start of Frame (SOF), End of Frame (EOF) or primitives such as the Idle (I) or Receiver Ready (RRDY).

In view of the above rules, prior 8B/10B receiver systems employed the detection by the receiver of a single comma as a sufficient condition to send resynch flag to initiate synchronization or resynchronization of the data byte boundaries in the receiver.

While the K28.5 code is unique and cannot be formed by valid aliased code, if there are transmission errors, such as 1 bit or 2 bit errors, the K28.5 can be randomly created which byte would not necessarily create a detectable disparity error. In existing 8B/10B decoders, this condition can cause a misalignment of data byte boundaries and result in long runs of erroneous data decoding.

Accordingly, it is an object of this invention to provide a method and apparatus providing a type of redundancy check before a synchronization or resynchronization is allowed.

SUMMARY OF INVENTION

To accomplish the above stated objective we have invented a method and apparatus for controlling receiver synchronization or resynchronization which only allows synchronization to take place after a plurality of synchronization code bytes have been received, which synchronization code bytes are separated by no more than a certain predefined number of bits, and further provided that the number of separating bits is an exact multiple of the byte length.

A feature of our invention is to count the number of bytes between a first and second sync byte and to only permit synchronization on the second such sync byte if less than 4 bytes occurs between decoding of said sync byte, and if the sync byte and end flag byte coincide.

DETAILED DESCRIPTION OF THE INVENTION

Figure 1:
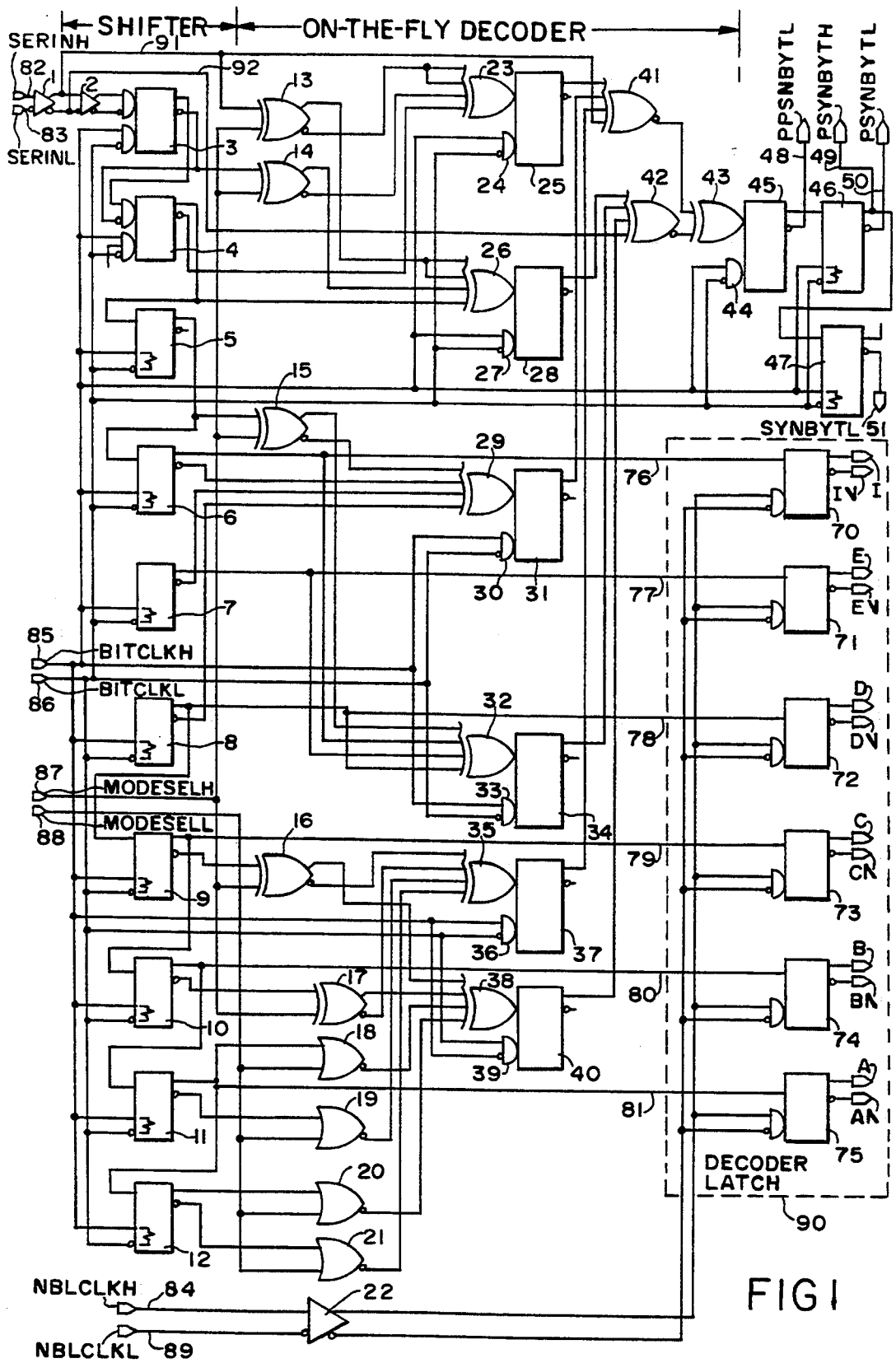
FIG. 1 is a schematic diagram of a preferred shifter and an on-the-fly decoder.

To maintain byte alignment and to decode the correct symbols transmitted across a serial link, the special character sync K28.5 pattern or a derivative thereof is sent by the transmitter and decoded by the receiver to reset its byte boundaries in alignment therewith.

Although the Fibre Channel Standard specifies that the ordered set commands are all four bytes long, there are other applications which don't use four byte delimiters between data packets. Accordingly, it is also desired that resynchronization is enabled in a redundancy type mode for those instances when the Fibre Channel Standard is not in effect. Specifically, our synchronization invention will also be applicable to the case where the transmitter is providing repeated one byte coded synchronization command signals.

In addition, there is another mode of operation known as the 10B/12B mode which is more fully described in our concurrently filed patent application entitled *"Method and Apparatus for Transmitting and Receiving Both 8B/10B Code and 10B/12B Code in a Switchable 8B/10B Transmitter and Receiver,"* Ser. No. 07/839,864, filed Feb. 21, 1992, inventors Arthur Hsu, Yun-Che Wang, Marc Gleichert, assigned to the same assignee, AMD Docket No. A850. In the 10B/12B Mode, the system architecture is modified to deal with 10 bit raw data bytes and to encode such data into 12 bit coded bytes. The 5B/6B code is employed in the 10B/12B Mode, and a 12 Bit unique special character synchronization byte is provided in this mode. It is our intention that the resynchronization method and apparatus of this invention will be equally as useful in all the above modes of receiving operation.

We have defined below the redundancy sync pattern of our invention to accommodate the system modes described above, and to provide protection against link data loss. The redundancy sync pattern is a K28.5 followed by K28.5, either immediately or after n data bytes, where n is an integer less than 4. Data at the receiver decoder input is realigned after the second K28.5, provided that the number of intervening bytes is less than 4 and provided that the K28.5 occurred at the same time as a byte boundary of the first K28.5. In the 10B/12B mode, the sync pattern is the unique K28.D/13/18, i.e., (−) 001111101100 (+) or ALTERNATE, hereafter called "K28.1*" These four possible redundancy sync patterns are:

| 8B/10B | 10B/12B |
| --- | --- |
| K28.5, K28.5 | K28.*, K28.* |
| K28.5, Byte, K28.5 | K28.*, Byte, K28.*, |
| K28.5, Byte, Byte, K28.5 | K28.*, Byte, Byte, K28.* |
| K28.5, Byte, Byte, Byte, K28.5 | K28.*, Byte, Byte, Byte, K28.* |

When in the 8B/10B mode the byte length is 10 bits, and the byte length is 12 bits in the 10B/12B Mode.

The receiver accepts encoded NRZ serial data and the clock information is extracted from the encoded data using a phase locked loop circuit (PLL). The clock recovery PLL in the receiver examines every transition in the arriving serial data stream and aligns its own bit-clock with these data transitions. All data transfers and decoding in the receiver are synchronous to the bit clock.

In addition, as discussed above, the incoming serial data stream, SERIN, is continuously monitored by the byte sync logic to maintain properly aligned byte boundaries in all modes. With references to FIG. 1, on the left side of drawing, a serial shifter including buffers 1 and 2, and the flip-flops 3 through 12 is disclosed. The serial encoded SERINH on line 82 and SERINL on line 83 are connected to buffer 1. The output of buffer 1 is coupled to buffer 2. Between buffer 1 and buffer 2 are lines 91 and 92 that are connected to OR gates 41 and 42 respectively. Lines 91 and 92 bypass one stage of flip-flops and their one bit delay. The outputs of the buffer 2 are coupled to flip-flop 3 and are clocked in on the occurrence of BITCLK is the output of the receiver bit clock generator. Each of the Flip-Flops 3–12 are coupled together so as to shift the data along at each BITCLK. The outputs of the six serial shifters flip-flops 6 through 11 are coupled to the decoder latch 90, shown in the dashed line rectangle on the lower right side of FIG. 1. The state of these flip-flops are clocked into the latch flip-flops by the signal called NBLCLK, which stands for nibble clock pulse. NBLCLK is the pulse which defines the byte boundaries and which must be correctly timed if the data packets are to be established correctly for proper decoding in the receiver.

Accordingly, the purpose of synchronizing the receiver to the transmitter is to properly establish the timing of NBLCLKH and NBLCLKL. This is made possible by examining, in the 8B/10B mode, the incoming data stream on-the-fly in a combinatorial decoder which is set up to decode the synchronization byte K28.5 (−) and K28.5 (+) codes. The 8B/10B mode is selected when MODSELH on line 87 is low. When MODSELH is high, the 10B/12B mode is selected and the special K28. D13/18 is set up to be decoded.

When the proper incoming code sequence appears in the shifter and the outputs are combined in the final OR gate 43, FF45 to set at the next BITCLK. After FF 45 is set, FF46 and FF47 are set on the next pair of BITCLK pulses. This provides a trio of 1 bitclock delayed signals which flag the occurrence of the synchronizing byte in the SERIN data. The signal called PPSNBYTL 48 is the earliest. PSYNBYT H, 49 and PSYNBYTL, 50, are complementary signals which are one BITCLK time earlier than the primary signal we use to synchronize the receiver, SYNBYTL 51.

Figure 2:
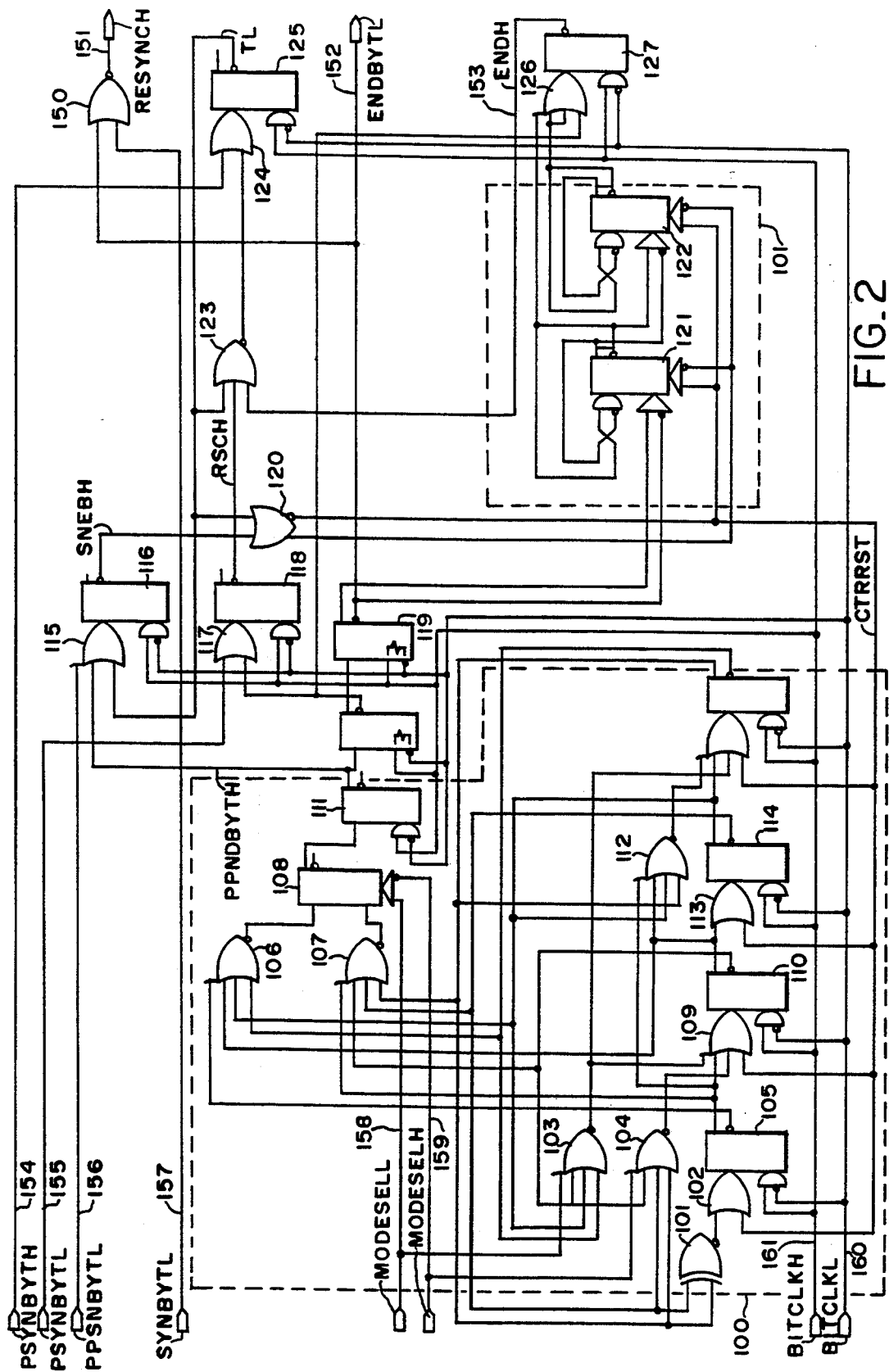
FIG. 2 is a schematic of circuits to issue a conditioned RESYNCH command.

With reference to FIG. 2, the remaining portion of my receiver redundant synchronization decoding circuit is disclosed. In the region within the dashed lines 100 in the lower left hand corner of FIG. 2, we employ a count-by-ten/count-by-12 circuit. When the MODSELH is low, the 8B/10B mode is selected and the MUX 108 only takes in data from its top port connected to OR gate 106. This yields an output pulse from the MUX 108 to FF 111 every 10 bitclk pulses. With MODSELH in the high state, the 10B/12B mode is selected and the output of MUX 108 to FF111 is one pulse for every 12 bitclk pulses.

The remainder of the FIG. 2 circuits are employed to condition the issuance of the resynch control on line 151 to the criterion that two synchronization code bytes were received which were separated by exactly 0,1,2 or 3 bytes.

Within the dashed line area 101 is a count-to-four circuit which is incremented once each time the count-by-ten circuit (or count-by twelve) within dashed lines 100 causes flip-flop 119 to change state. Assuming the count-by-four counter was reset and then received four inputs to FF121, the ENDH flip-flop 127 goes high which causes the "T" latch, flip-flop 125 to go low, which output is coupled back to OR gate 115, and if a sync byte has occurred, i.e. PPSYNBTL, 156 to OR gate 115 at the same time, flip-flop 116 will issue a SNEBH (Synch byte but no end byte) to OR gate 120, the output of which is the reset for the count-by-ten counter 100 and the count-by-four counter 101.

The resych command 151 is issued on the simultaneous occurrence (i.e., or logical AND) of SYNBYT and ENDBYT. In FIG. 2 this is shown as the equivalent logical NOR of SYNBYTL 157 & ENDBYTL 152. At this point the "T" flag flip-flop 125 is reset (RSCH) which resets the 10's and 4's counters leaving them ready to start counting upon the occurrence of the next SYNBYT detection.

To summarize the operation of the circuits of FIG. 2., the TL flip-flop 125 is set by PSYNBYTH 154, and the simultaneous occurrence of SYNBYT and ENDBYT will issue a RESYNC 151. If more than four cycles of the tens counter occur after the TL flip-flop sets, the four's counter 101 sends an ENDH pulse to reset the "T" latch and reset the ten counter and four counter which will preclude issuance of a RESYNCH on receipt of the next SYNBYTL.

The RESYNC 151 flag is coupled to the nibble clock counter (not shown) and resets the nibble clock counter so that the very next nibble is clocked into the decoder latch in the properly aligned state, It is understood that our invention could be provided by implementation and embodiments other than the circuits of our disclosed embodiment. It is our intention that our invention should not be limited to the embodiment disclosed but should be construed in accordance with our claims.

We claim:

1. In a method for generating a resync control signal in an 8B/10B receiver for initiating byte alignment between a transmitter byte and receiver byte including the steps of, sending from said transmitter to said receiver over a communication link a plurality of sequential, identical, unique, special character code sync bytes, said unique special character code sync bytes comprising a comma sequence, said unique special character code sync bytes being separated by n bytes, where n is any selected integer equal to or greater than zero and wherein said n bytes between said unique special character code sync bytes do not include the comma sequence;

receiving and decoding unique said special character code sync bytes in said receiver;

sending said resync control signal to a byte alignment circuit in said receiver upon decoding of both a first and second said identical unique special character code sync bytes provided that said first and second identical unique special character code sync bytes are sequential and are determined to be separate by less than a predetermined amount of time.

2. The method of claim 1 wherein said predetermined amount of time separating said first and second unique special character code sync bytes is determined by counting the number of bit clock pulses or number of bytes occurring between the first and second identical unique special character code sync bytes; and further providing that said number of bit clock pulses is exactly equal to n times the number of bits in said bytes for the mode of operation.

3. The method of claim 2 wherein said counting step includes starting a counter responsive to said first identical unique special character code sync byte;

counting in said counter the occurrences of a pulse indicative of the number of bytes received between time of receipt by the receiver of said first and second identical unique special character code sync bytes.

4. The method of claim 3 wherein said predetermined time separation time is less than the time of four bytes according to the number of bit clock pulses and wherein said predetermined time separation is exactly 0,1,2 or 3 bytes.

5. The method of claim 4 wherein said unique special character sync byte is K28.5 or K28.D 13/18.

6. The method of claim 1 wherein said unique special character code sync byte is K28.5 or K28.D 13/18.

7. A method for generating a resync command flag in an 8B/10B receiver for initiating resynchronization byte alignment between a transmitted code and a receiver capable of operating according to the Fibre Channel Standard ANSI X3T9.3 comprising, transmitting encoded digital data including a plurality of separated special character sync codes, said special character sync codes including a comma sequence, said special character sync codes being separated by at least three bytes of other code;

decoding said transmitted encoded digital data in the receiver;

starting a counter in said receiver responsive to the receipt of a first said special character sync code;

counting in said counter the number of bytes; and issuing said resync command flag if a said second of said special character sync codes is received before said counter indicates the occurrence of four bytes.

8. In a method for controlling receiver/transmitter synchronization in an 8B/10B receiver in which the receiver aligns its byte boundaries after receipt of and responsive to a specified unique resynchronization code bytes, THE IMPROVEMENT COMPRISING, decoding digital data received by said receiver by on-the-fly combinatorial logic circuits looking for said specified unique resynchronization code byte;

resynchronizing said receiver responsive to said specified unique resynchronization code byte only after two said specified unique resynchronization code bytes have been received which said two specified unique resynchronization code bytes are less than a specified number of bytes apart.

9. The method of claim 8 wherein said specified number of bytes apart equals less than four.

10. A 8B/10B receiver resynchronization command circuit having a terminal for receiving serial-in data comprising:

an on-the-fly comma decoder, said decoder being connected to said serial-in data terminal, said decoder providing a first and second sync byte received flags upon decoding a first and second comma in said serial-in-data;

counter means, said counter means being connected to said terminal for receiving serial-in data, said counter means being responsive to said first and second sync byte received flags from said on-the-fly decoder to count bytes received by said counter means in the period between said first and second sync byte received flags; and means to evaluate the number of said bytes counted by said counter means, and to issue a resync command flag when the number of said bytes counted is less than a predetermined number, wherein said predetermined number is 4.

11. The circuit of claim 1 wherein said counter comprises a count-by-four counter which is reset upon receipt of said second sync byte received flag.

* * * * *